United States Patent [19]

Sowman

[11] B  4,125,406

[45] Nov. 14, 1978

[54] ALUMINA-CHROMIA-METAL (IV) OXIDE REFRACTORY FIBERS HAVING A MICROCRYSTALLINE PHASE

[75] Inventor: Harold G. Sowman, Maplewood, Minn.

[73] Assignee: Minnesota Mining and Manufacturing Company, St. Paul, Minn.

[21] Appl. No.: 502,773

[22] Filed: Sep. 3, 1974

[44] Published under the second Trial Voluntary Protest Program on January 13, 1976 as document No. B 502,773.

Related U.S. Application Data

[63] Continuation-in-part of Ser. No. 376,628, Jul. 5, 1973, abandoned.

[51] Int. Cl.² .................. C04B 35/10; C04B 35/12; C04B 35/18
[52] U.S. Cl. .......................... 106/57; 106/65; 106/66; 106/73.33; 106/73.4; 106/73.5
[58] Field of Search .............. 106/57, 65, 66, 73.3, 106/73.33, 73.4, 73.5

[56] References Cited

U.S. PATENT DOCUMENTS

| | | | |
|---|---|---|---|
| 3,311,481 | 3/1967 | Sterry et al. | 106/65 |
| 3,311,689 | 3/1967 | Kelsey | 106/73.33 |
| 3,503,765 | 3/1970 | Blaze | 106/69 |
| 3,585,153 | 6/1971 | Kiehl et al. | 106/66 |
| 3,632,709 | 1/1972 | Hayes et al. | 106/65 |
| 3,652,749 | 3/1972 | Sobel et al. | 106/66 |
| 3,808,015 | 4/1974 | Seufert | 106/65 |
| 3,814,782 | 6/1974 | Hayes et al. | 106/65 |
| 3,849,181 | 11/1974 | Green | 106/65 |

*Primary Examiner*—J. Poer
*Attorney, Agent, or Firm*—Cruzan Alexander; Donald M. Sell; Mark A. Litman

[57] ABSTRACT

Refractory fibers having a composition of 10–75% Al$_2$O$_3$, 1–30% Cr$_2$O$_3$ and 10–75% metal (IV) oxide selected from at least one of silica, titania, zirconia, and tin oxide and having at least one microcrystalline phase therein may remain strong, flexible, and continuous at temperatures of 1300° to 1500°C and beyond.

14 Claims, 1 Drawing Figure

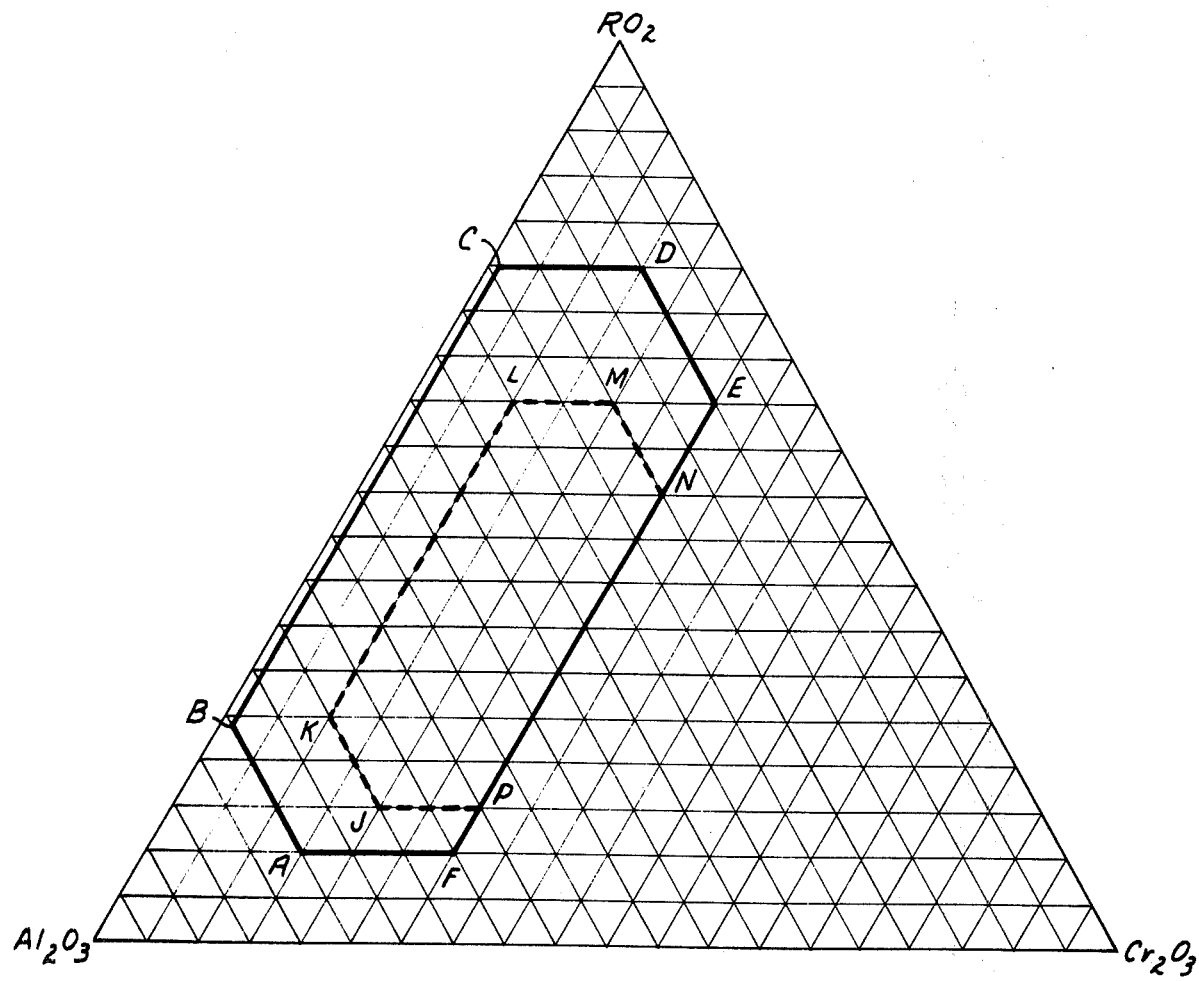

ALUMINA-CHROMIA-METAL (IV) OXIDE REFRACTORY FIBERS HAVING A MICROCRYSTALLINE PHASE

This application is a continuation-in-part of U.S. Ser. No. 376,628, filed July 5, 1973, now abandoned.

Within the last decade, an amount of literature has been published describing various polycrystalline, microcrystalline, or non-vitreous fibers and other shaped articles of refractory metal oxides made by various non-melt processes, such as by drying films of solutions of oxygen-containing metal compounds, or drying organic polymeric bodies, such as cellulose or rayon, impregnated with such a solution, or by extruding and drawing, or spinning, viscous fluids of such metal compounds into fibers, followed by heating to remove water, organic material, and other volatile material to produce a refractory article. A review of the state of the art of polycrystalline inorganic fibers appears in Chapter 8 of "Modern Composite Materials" edited by Brautman and Krock, published by Addison-Wesley Pub. Co., Reading, Mass. (1967). Other art in this area is Netherlands Pat. No. 7,015,245, British Pat. No. 1,287,288, U.S. Pat. Nos. 3,385,915, 3,632,709, 3,663,182 and the art cited in U.S. Pat. No. 3,709,706. Oxide fibers other than those identified as fiberglass are still in the relatively early stage of development. In many technologies, there is a need for a relatively inexpensive continuous refractory fiber product with desirable physical properties, such as high strength, high modulus of elasticity, chemical resistance, and the retention of such properties after exposure to high temperatures beyond the capability of presently commercially available fiber materials.

This invention relates to shaped, fired, refractory fibers having at least one microcrystalline phase. The fibers of this invention may also be polycrystalline and contain amorphous species. The fibers of this invention have an overall composition range of 10–75% $Al_2O_3$, 1–30% $Cr_2O_3$ and 10–75% $RO_2$ where $RO_2$ is a metal (IV) oxide or combination of metal (IV) oxides, the metal selected from the group including silicon, titanium, zirconium or tin. The fibers of this invention have properties which enable their use in many environments. These fibers may be exposed to high temperatures (e.g., 1300° to 1500°C) and may remain strong, flexible and continuous. The fibers can be subjected to ordinary textile processing to produce multifilament textile structures (e.g., rovings, cords, yarns, etc.) and can be worked into non-woven, woven and knitted fabrics by conventional techniques as either staple or continuous fibers.

Briefly, the refractory fibers of this invention are solid, shaped and fired and non-vitreous comprising from 10–75% $Al_2O_3$, 1–30% $Cr_2O_3$, and 10–75% $RO_2$. These fibers are made by a non-melt process comprising shaping the viscous concentrate into a fiber form and dehydratively or evaporatively gelling an aqueous liquid mixture containing metal compounds such as soluble salts, sols or dispersible colloids or mixtures thereof which are calcinable in air to a mixture of oxides, to result in a "green" or non-refractory amorphous fiber and heating and firing the shaped green fiber to remove water, decompose and volatilize undesired constituents and convert it into said refractory fiber. A particularly desirable composition comprises 2–25% $Cr_2O_3$, 20–65% $Al_2O_3$ and 15–60% $RO_2$. The firing itself additionally dries the fiber and may be sufficient drying for the process because the transportation of fibers to the furnace after extrusion may be sufficient drying.

Shaped and fired refractory fibers of this invention can be made by extruding in air a viscous, fiberizable concentrate of said mixture of solutions, sols, or solutions and sols and then heating and firing the resulting green fibers to form continuous, uniformly round or oval, strong, flexible, smooth, glossy refractory polycrystalline fibers, said fibers being useful in making refractory textile fabric or as fillers or reinforcement for plastic composites.

The terms "dehydrative gelling" or "evaporative gelling", as used herein, mean that sufficient water and volatile material are removed from the shaped green fibers so that the form or shape of the fiber is sufficiently rigid to permit handling or processing without significant loss or distortion of the desired fibrous form or shape. Therefore, all the water in the shaped fiber need not be removed. Thus, in a sense, this step can be called partial dehydrative gelling. The shaped fibers in their green form are generally transparent to visible light and clear (or perhaps slightly hazy) under an optical microscope. The solidified gel articles before firing in their green form are amorphous, i.e., X-ray diffraction analysis does not show the presence of any crystalline species.

The alumina is preferably obtained from aluminum isopropoxide, aluminum formoacetate, or mixtures thereof, although it may be derived from sols, e.g., such as one prepared by the digestion of aluminum metal in an aqueous aluminum chloride solution. A convenient source of aluminum formoacetate is Niacet® obtained from Union Carbide Corporation.

Chromia is obtained preferably from chromium (III) acetate, $CrCl_3 \cdot 6H_2O$, or chromic (III) oxide, although the latter may cause excessive bubble formation in compositions of high chromia content especially when organic salts or other organic sources are present in the mixture.

Silica is available in colloidal aqueous suspensions from several commercial sources, e.g., such as Ludox® LS, Nalco® 1034A, Ludox® AM, Ludox® AS, Nalco® 1030, and Monsanto Syton® sols.

Titania is preferably provided from tetraisopropyl titanate, although $TiCl_4$ or a sol (prepared from an aqueous solution of the chloride followed by precipitation with $NH_4OH$, washing, and redispersion into a sol by the addition of an acid such as HCl) may be economically more attractive.

Zirconia is provided from zirconium acetate or an inorganic salt such as zirconyl chloride.

Stannic (IV) oxide values are obtained from $SnCl_2 \cdot 2H_2O$, $SnCl_4 \cdot 5H_2O$, or stannous (II) tartrate.

The final fiber product of this invention has been found to generally be porous. This porosity has been observed by the penetration of oil into the fiber which can be seen with microscopic examination of the fibers.

There are some additional general characteristics of these fibers which should be noted which are a result of varying the composition of the fibers or process parameters within the broad range of this invention. Fibers of this invention having a silica content of less than 50% were found to have at least two distinct zones of composition and properties. One zone was the core of the fiber and the second zone was a sheath or skin which is formed on the fiber during firing. These zones were observed as different refractive indices in the sheath and core, and by differential oil penetration.

All compositions did contain at least one crystalline phase after a heat treatment of at least 600°C., and an alumina-chromia solid state solution is generally, but not always present as one of the crystalline species. Above 20% $Cr_2O_3$, that crystalline species is always found to be present. With all compositions, a greater degree of crystallinity (higher quantity and greater size) is obtained with higher temperatures in the process.

The concentration of the mixture for fiber formation can be carried out by techniques known in the art, various details as to the preferred techniques being disclosed in U.S. Pat. No. 3,709,706. For example, the mixture can be concentrated with a "Rotavapor" flask under water-aspirator vacuum, the vacuum adjusted to prevent or minimize frothing or loss of the sol. Sufficient concentration will be obtained when the equivalent solids content of a calcined sample is generally 25 to 50 weight percent, and the viscosity (Brookfield at ambient room temperature) of the concentrate is in the range of 15,000 to 1,000,000 cps., preferably 25,000 to 500,000 cps. Organic fugitives such as corn syrup or polyvinyl pyrolidone may be required if such a state of fiberizability is not obtained with the salts or sols used as the oxide sources. Acids may be required in the dissolution of salts used in said solutions.

The viscous concentrates are relatively stable but low temperature storage or refrigeration may be preferred if the concentrate is not to be used shortly after preparation, e.g., within 24 hours. Prior to extrusion, the concentrate can be centrifuged to remove air bubbles. The particular equivalent solids content or viscosity used for fiber formation will be dependent on the particular apparatus and conditions used to extrude the viscous concentrate. For example, when the viscous concentrate is extruded under pressure, e.g., 3.5 to 70 $kg./cm^2$, using a conventional spinnerette with a plurality of orifices (e.g., 15 to 1,000 or more orifices with diameters of 0.025–0.25 mm.), such as used in the rayon industry, the viscosity of the concentrate should be such that fibers are formed in a continuous manner without breaking of the extruded fiber as it is formed.

The extruded green fibers formed by this invention can be allowed to fall in air by the force of gravity or drawn mechanically in air by means of rolls or a drum or winding device rotating at a speed faster than the rate of extrusion, or the concentrate can be extruded through orifices from a stationary or rotating head and blown by parallel, oblique or tangential streams of air, such as in the making of cotton candy, the blown fibers being collected on a screen or the like in the form of a mat. Any of these forces exerted on the extruded fibers, e.g., gravity, drawing, or air streams, cause attenuation or stretching of the fibers, reducing their cross-sectional area by about 50 to 90 percent or more and increasing their length by about 100 to 1,000 percent and serve to hasten or aid the drying of the fibers.

The dehydrative gelling of the green fibers is carried out in ambient air or heated air can be used if desirable or necessary to obtain faster drying. The relative humidity of such air should not be too high, since large amounts of moisture will prevent drying and cause the gelled green fibers to stick together. Generally, in the practice of this invention, relative humidity in the range of 20 to 40 percent is preferred, at a temperature of 15° to 30°C. If the humidity is high and must be tolerated, compensations can be made by using a concentrate with a greater equivalent solids content or a higher viscosity, extruding at a lower rate, using a lower drawing rate, using a smaller extrusion orifice, exposing the green fibers to heated air as they are formed, and/or increasing the distances between the extrusion orifice and the point where the individual extruded fibers come into contact. On the other hand, if the relative humidity is too low, e.g., 10 to 15 percent, or lower, the green fibers dry too fast and they will tend to break or fracture during spinning or handling before they can be fired. Low humidity conditions may be compensated for by extruding at a faster rate, using larger extrusion orifices, decreasing the distance between the orifices and the point where the fibers come into contact with one another or the drawing rolls, and/or using concentrates with lower equivalent solids content or lower viscosities. Air currents should be minimized or controlled because they may cause the individual extruded fibers to come into contact before they are sufficiently dry to prevent adhesion or cause fiber breakage. A thin coating of grease, lubricant, or sizing, such as "Halocarbon" 25–5S (halogenated polychlorotrifluoroethylene thickened with silica gel) or "ANTIFOAM A SPRAY" (silicon defoamer) can be applied to the face of the spinnerette to minimize the sticking of the concentrate or extruded fibers to the spinnerette face. In any event, the extruded fibers should be made or handled under conditions which will prevent or minimize their contact with one another before they are sufficiently dry to prevent sticking.

The green fibers can be brought into contact to form a strand of multi-fibers and the strand can be sized to hold the fibers together without fiber-to-fiber bonding. Where a size is used, the strand (or extruded fibers) can be mechanically drawn over a size applicator, like that used in the textile industry, and a conventional heat fugitive size or lubricant, such as oil, applied. Controlled rates of heating can be used to volatilize the size so as to avoid combustion of the size when the green fibers are fired, such combustion tending to cause overheating of the fibers (i.e., the temperature and rate of temperature rise caused by combustion may be higher than desired). The size may also require longer heating to completely remove it during the firing process.

When the shaped green fibers are fired in air to convert them into refractories, the composition develops a microcrystalline phase, composed of a plurality of crystallites, the size of the crystallites being generally less than one micron and being distinguished from macrocrystals or "whiskers" which are single crystals measured in terms of millimeters or centimeters. The crystallite size has been estimated from line broadening in X-ray diffraction patterns and by electron microscopy.

Further detail on the extruding of fibers from the viscous concentrate will be omitted here in the interest of brevity since applicable shaping procedures are known in the art, reference being made to U.S. Pat. No. 3,709,706, Belgium Pat. No. 779,966, and Chapter 8 of "Modern Composite Materials" text, supra, which illustrates and describes apparatus which can be used in this invention to form fibers from viscous concentrates.

The fibers in the green or unfired gel form are dry in the sense that they do not adhere or stick to one another or other substrates and feel dry to the touch. However, they still may contain water, acid and organics, and it is necessary to heat and fire the green fibers in order to remove these remaining fugitive materials and convert the green fibers into refractory fibers.

Generally, the use of salts of an anion which are decomposed thermally in a controlled manner is preferable in the practice of this invention. Thus, simple organic anions are preferred over inorganic anions. It is important to understand, however, that excessive organic anions may also cause firing problems. Therefore, it is preferable that part of the mixture composition be introduced as a sol. This helps to minimize the amount of decomposable fugitive using a sol of dispersed metal oxide colloids.

The fibers may be transparent, translucent, or opaque, depending upon the composition and the temperature at which they are fired. Compositions which have a higher chromia content tend to be translucent. Also, firing the fibers at temperatures above 1200°C tends to convert the composition to a predominately microcrystalline form.

The microcrystallites detected by X-ray difdraction are estimated to be between 500–1000 Å. Fibers fired at lower temperatures are predominately a solid solution of alumina and chromia. The X-ray diffraction pattern of $3Al_2O_3:1Cr_2O_3:3SiO_2$ shows a hexagonal lattice with $a_o=4.887$ Å and $c_o=13.35$ Å; whereas the lattice parameters for alumina are $a_o=4.758$ Å, $c_o=12.991$ Å; and the parameters are $a_o=4.954$ Å, $c_o=13.58$ Å for $Cr_2O_3$. The X-ray diffraction patterns of compositions containing $Al_2O_3$-$Cr_2O_3$ show essentially the solid solution at temperatures below about 1200°C with traces of $\alpha$-$Al_2O_3$ above that temperature. Above about 1300°C, the mullite pattern appears with the solid solution. Compositions of $Al_2O_3$-$Cr_2O_3$-$TiO_2$ fired at higher temperatures show rutile as well as the solid solution.

Certain compositions of this invention exhibit greater strength and flexibility after exposure to very high temperatures than most inorganic fibers known in the art. For example, four samples of fabrics were fired at 1550°C for one hour and compared. Irish Refrasil® ($SiO_2$ containing $Cr_2O_3$-HITCo) lost most of its green color and strength after firing. The cloth also became somewhat "bourdy" due to this treatment. Zircar® (ZYW-30 $ZrO_2$ from Union Carbide Corp.) became very brittle and weak with little strength remaining. A 3M cloth made of 90% $3Al_2O_3.1B_2O_3$ $3SiO_2$ with 10% $Cr_2O_3$ became brittle and weak. In contrast, $3Al_2O_3:1Cr_2O_3$:$3SiO_2$ was still flexible, shiny, and strong after firing.

The compositions bounded by ABCDEF of FIG. 1 form refractory, continuous fibers comprising at least one microcrystalline phase. In the high chromia area outside of line segment EF, the fibers are fragile and break into short segments or powder on handling the fired fibers. The fibers prepared with compositions along the line segment BC overlap the compositions of U.S. Pat. No. 3,449,137, but the fired fibers of this invention are not glasses as are those of the prior art. A preferred region of FIG. 1 is the area enclosed by JKLMNP. Superior fibers are obtained in this region. It should be noted that U.S. Pat. No. 3,449,137 specifically desires to prevent the formation of crystalline species in its products.

The tensile strength and modulus of elasticity increase in a more or less regular fashion as the firing temperature increases. Most interesting is the high tensile strength after exposure to 1400°C in air even though crystalline changes have occurred as indicated by X-ray diffraction analysis.

Firing can be accomplished in a number of ways, for example, by heating in a single step to a desired temperature or by heating in a series of steps at progressively higher temperatures, with or without cooling or storage between steps. The green fibers can be fired in the form of individual fibers or collected in a regular or random order and heated, or heated in the form of strands (a plurality of untwisted, parallel-aligned fibers), or fired in the form of hanks (a bunch of fibers or strands), or they can be chopped in the form of staple and fired in that manner. Also, the green strands or fibers can be combined, twisted or untwisted to form yarn and fired as such or can be woven to form a cloth and heated in the latter form. In order to ensure the production of continuous refractory fibers with lengths as great as 3 to 6 meters or longer, the green fibers are preferably heated in the form of a multi-fiber strand which is accumulated or collected in a loose, relaxed, unrestrained or slack configuration, such as offset or superimposed loops, as disclosed in said Belgium Pat. No. 779,966.

In firing the green fibers, ignition of combustible material in or evolved from the fibers should be avoided since such ignition may cause a rapid rise in temperature or a catastrophic evolution of volatiles, resulting in the formation of opaque, fragile fibers. Ignition may be avoided, for example, by starting out at a low temperature, e.g., room temperature, and elevating the temperature at a controlled rate. If the green fibers are not to be fired completely in one operation or are not to be fired immediately or soon after their formation, it may be desirable or necessary to store the fibers in a relatively dry or protective atmosphere to prevent them from picking up moisture or contaminants and deteriorating or sticking together.

The firing step volatilizes the balance of $H_2O$ and anion component, decomposes and volatilizes organic material, and removes carbon, the resultant fiber being homogeneous and refractory. This firing step also causes some shrinking of the fiber, however, the fibrous shape of the article during firing remains intact and fibers when so fired are still of essentially continuous length.

The refractory fibers of this invention are staple or continuous and generally have a rounded or ovoid cross section. The term "continuous fiber" as used in this application means a fiber (or multi-fiber article such as a strand) which has a length which is infinite for practical purpose as compared to its diameter. The continuous fibers of this invention, in green or refractory form, can be as long as 3 to 6 meters, or longer, fibers of shorter length than this arising only from occasional flaws due to minute inhomogenities, such as foreign particles or bubbles, stemming from their presence in the viscous concentrate precursor, or due to restraint during drying as by drying on a cylinder or from inadvertent mechanical fracture. By bringing a plurality of the fibers together in the form of a continuous strand, tow, yarn, or other multi-fiber article, the occasional breakage or fracture of a continuous fiber does not affect the practical utility of the multi-fiber article containing a fiber whose length is relatively short. In any event, the fibers of this invention, even if broken or fractured for reasons given above, can be made in lengths which are significantly longer than the length of a staple fiber.

Solids equivalent or oxide equivalent or solids content are used interchangeably to mean the equivalent oxide solids content and this value is determined by calcination of the precursor to the resulting metal oxide composition and is expressed as a weight percentage based on the weight of the precursor.

U.S. Pat. Nos. 3,585,153 and 3,560,408 relate to high alumina content fibers and mats which are stable at temperatures above 1000°C. No fibers are specifically shown or described having the compositions required in the practice of this invention, however, even more significant differences exist between the fibers of the present invention and those of the references. The fibers disclosed in both aforementioned patents desire and have high specific surface areas, preferably at least about 70 $m^2/g$. The process of manufacture disclosed in these patents is specifically designed to enhance a large specific surface area in the fibers. No fibers are fired in these patents without the prior surface area enhancing water vapor treatment.

The increased specific surface area of these prior art fibers is important to the catalytic utility of the mats disclosed in the patent. As is shown in the examples of this invention (e.g., table following example 10), an increase in specific surface area as desired in the prior art patents above referred to is coincidental with a decrease in the tensile strength of the fibers. Fibers of the present invention having greater than 60% by weight $Al_2O_3$ must have less than 30 $m^2/g$ specific surface area and preferably less than 20 $m^2/g$ specific surface area. Particularly those fibers having 55 to 75% $Al_2O_3$, 1–10% $Cr_2O_3$ and 15–44% $RO_2$ exhibit transparency and low specific surface areas (less than 15 $m^2/g$) when made according to the practice of this invention as compared to high alumina content fibers of the prior art of different composition which have surface areas on the order of 70 $m^2g/$. The transparency exhibited by these fibers is an indication of uniformity of quality, small crystallite size, small pore size, and smooth surface characteristics.

Transparency of these fibers exists where if one fiber crosses over and touches another, when viewed by a binocular microscope with oblique light, the diffracted out-line of the fiber below can be seen as a sharp image through the top fiber.

EXAMPLE 1

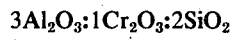

A solution was made by dissolving 88.8 gms. aluminum formoacetate (Niacet® - Union Carbide Corp.) in 250 ml. $H_2O$ heated to 70°–80°C. After cooling, 34.4 gms. Nalco® 1034A colloidal silica (~34% $SiO_2$) sol was added to the aluminum-containing solution, and to this mixture 53.3 gms. $CrCl_3.6H_2O$ was added directly and dissolved therein. The resultant mixture was concentrated in a Rotavapor® flask until readily fiberizable (viscosity ~100,000 cps), extruded through a spinnerette containing six 0.075 mm holes, and drawn by and collected on a 15 cm diameter drum. Dry green-state fibers were removed from the drum and further dried at 60°C for 40 hours. They were placed in a Pyrex® dish and heated to 300°C over a period of ~ 1-½ hours. At this temperature, the fibers were shiny and green in color. The fibers were fired to 700°C and were black in color. After heating at 700°C for 1-½ hours, the fibers were green in color, shiny, and smooth. Part of the 700°C fired fibers were further fired to 900°C and held at 900°C for one hour. These fibers were darker green in color than the 700°C fired fibers, continuous, and quite strong. Some fibers appeared to be clear, some translucent, and some opaque when examined at 48X under a stereoscopic microscope. Some of the 700°C fired fibers were fired at 1220°C for 24 hours and examined, while dispersed in oil, at 400X under a microscope. Fibers were flexible, continuous, ~6–10$\mu$ diameter, and were lighter green in color than the 700°C or 900°C fired fibers. These fibers appeared to be transparent with some apparent grain growth. The composition of these fibers was calculated to be 53% $Al_2O_3$, 26.2% $Cr_2O_3$, and 20.8% $SiO_2$ or equivalent to a mole ratio 3:1:2 respectively.

EXAMPLE 2

A solution was made by dissolving 34 gms aluminum formoacetate in 75 ml. $H_2O$ heated to ~70°C. A second solution was made by dissolving 52.3 gms. chromium acetate in 100 ml. $H_2O$, and this chromium salt solution mixed together with the aqueous aluminum formoacetate solution. To this mixture was added 202 gms. silica aquasol (Nalco® 1034A) containing the equivalent of 34% silica solids and made more acidic with 4 drops of concentrated HCl. The resultant dispersion was filtered through a No. 50 Whatman filter and concentrated in a Rotavapor® flask to a viscosity of about 100,000 cps.

The concentrate was extruded through a die with six 0.075 mm holes at a pressure of about 14 kg/$cm^2$ and drawn by and collected on a 15 cm diameter drum at a linear rate of ~50 m/min. The green-state fibers were clear, transparent, round, shiny, continuous, smooth, and green in color. The coil was cut, removed from the drum, and divided into several samples, which were then hung over a vitreous silica rod and fired in air from room temperature to 600°, 800° and 1000°C, respectively.

The 600°C fired fibers were continuous, predominately red to brown, clear, transparent, strong, shiny, and 30$\mu$ to 40$\mu$ diameter. Those fired to 800°C were green in color, with strength about the same as the 600°C fired fibers, smooth, shiny and opaque. Those fired to 1000°C were about the same as those fired to 800°C.

The fired fibers were calculated to contain 11.9% $Al_2O_3$, 17.8% $Cr_2O_3$, and 70.3% $SiO_2$ and the molecular ratios were equivalent to 1$Al_2O_3$:1$Cr_2O_3$:10 $SiO_2$. The only crystalline species shown by X-ray diffraction analyses was $Cr_2O_3$. The lattice dimensions with fibers fired at 600°C were slightly smaller than those generally obtained for $Cr_2O_3$. From broadening of X-ray diffraction lines, the estimated average crystallite sizes were ≤ 800 Å, ≤ 900 Å and <1000 Å for fiber samples fired at 600, 800 and 1000°C, respectively.

Light microscope studies provided the following information:

| Firing Temp. °C | $N_d$ (index of refraction) | Observations |
|---|---|---|
| 600 | ~1.556 | Porous; little or no microcrystallinity, very fine micromottling |
| 800 | >1.562 <1.570 | Porous; some crystallinity with green crystallites ~½$\mu$; oil penetrates rapidly; some micromottling |
| 1000 | ~1.56 | Porous; easily impregnated with oil; rough surface due to birefringent microcrystals ~1$\mu$ size; extensive micromottling |

Transmission electron microscopy studies on microtomed chips or slivers of fibers fired at 1000°C showed bundles of acicular or rod-shaped particles (530 Å to 3000 Å) randomly distributed in a porous matrix of close-packed somewhat cubic particles having diameters of from 130 A to 250 A.

EXAMPLE 3

$6Al_2O_3:1Cr_2O_3:30SiO_2$

A solution was made by dissolving 36 gms. aluminum isopropoxide in an aqueous solution of 24 ml formic acid and 240 ml $H_2O$. This resultant solution was heated to ~70°C and 26 gms. aluminum formoacetate (Niacet®) was dissolved therein. To this solution was added a solution made by dissolving 13.1 gms. chromium acetate (34% $Cr_2O_3$ equivalent) in 100 ml $H_2O$. Finally, 177 gms. aqueous silica sol (Ludox® LS) containing 30% by weight equivalent silica solids acidified to a pH of about one or less by the addition of 1 ml. concentrated HCl was added to the mixed solutions containing dissolved aluminum and chromium salts. The solution-sol mixture contained the equivalent mole ratios of $6Al_2O_3:1Cr_2O_3:30SiO_2$. After filtering through a No. 50 Whatman filter paper, the mixture was concentrated in a Rotavapor® flask until readily fiberizable (determined by inserting and withdrawing a glass rod). Oxide solids were equivalent to 47.4 weight percent. The concentrate was continuously extruded through a die containing six .075 mm holes at a pressure of 21 to 28 kg/cm² and drawn by and collected on a 15 cm diameter drum located about one meter below the die at a linear rate of about 45 meters/minute.

The coil of fibers was cut, removed from the drum, draped over a horizontal vitreous silica tube and fired in air from room temperature to 600°C over a period of about one hour. The fired fibers were round, shiny, clear, transparent, and gold in color. The fibers were strong and continuous and had an average size of about 30 micron diameter.

The 600°C fired fibers were fired again by inserting into a 600°C furnace and raising the temperature to 800°C. The resultant fibers were green, appeared to be crystalline under observation with a stereoscopic microscope at 140X, smooth, shiny, translucent to opaque, and felt stronger than when fired to 600°C.

Another batch was spun from the remaining concentrate and fired from room temperature to 400°C. The 400°C fired fibers were further fired to 600°, 800°, and 1000°C. The fibers fired to 400°C were straight, continuous, smooth, brown-gold in color and clear. The fibers fired from 400°C to 600°C were straight, continuous, smooth, gold in color, shiny, 15 to 40μ diameter and strong. Fibers fired from 400° to 800°C were similar to those fired to 600°C, but the color was green. Fibers fired from 400° to 1000°C were green but darker than when fired to 800°C and were clear to slightly polycrystalline and straight, smooth, strong and continuous.

The fired composition was calculated to be 23.9% $Al_2O_3$, 5.9% $Cr_2O_3$ and 70.3% $SiO_2$. The molecular ratios were $6Al_2O_3:1Cr_2O_3:30 SiO_2$.

EXAMPLE 4

$2Al_2O_3:1Cr_2O_3:5.94SiO_2$

A solution was made by dissolving 36 gms aluminum isopropoxide in 240 ml $H_2O$ + 24 ml formic acid. This solution was heated to ~70°C and 26 gms aluminum formoacetate (Niacet®) was dissolved in it. A solution made by dissolving 39.5 gms chromium acetate (34% $Cr_2O_3$ equiv.) in 150 ml water was stirred into the aluminum-containing solution. Ludox® LS (104.5 gms) was acidified with 10 drops HCl and added to the aluminum-chromium solution. The mixture was filtered through a No. 50 Whatman filter and concentrated in a Rotavapor® flask to an equivalent oxide solids content of 37.6%. The viscous, fiberizable concentrate was extruded through a spinnerette containing six 0.075 mm holes at a pressure of about 14 kg/cm² and drawn by and wound on a 15 cm drum at a linear rate of ~50 meters/min. The green-state coil of fibers was cut and separated into three bundles about 47 cm long which were draped over a silica rod and fired from room temperature to various temperatures. The first sample was fired to 600°C in about one hour and withdrawn. Most of the fibers were dark green, smooth, straight, strong, apparently polycrystalline and about 15 to 25μ diameter when observed with a stereoscopic microscope at 140X with oblique illumination and appeared to be opaque. When observed with transmitted light, they were translucent.

The bundle fired to 800°C in about 1-½ hours was similar to the 600°C fired sample but lighter green in color.

The bundle fired to 1000°C in about two hours was similar to the 800°C fired bundle.

The oxide content of these fibers was calculated to be 28.6% $Al_2O_3$, 21.3% $Cr_2O_3$, and 50% $SiO_2$, equivalent to a mole ratio of 2:1:5.94, respectively. The only crystalline species detected using X-ray diffraction analyses was $Cr_2O_3$, but the pattern showed slightly smaller lattice dimensions.

EXAMPLE 5

$6Al_2O_3:1Cr_2O_3:12.7SiO_2$

A solution was made by dissolving 36 gms aluminum isopropoxide (having 25% $Al_2O_3$ equivalent) in 240 ml $H_2O$ + 24 ml formic acid. This solution was heated to ~70°C and 26 gms aluminum formoacetate (Niacet®) dissolved therein to form a clear solution. A solution made by dissolving 10.7 gms chromium acetate (34% $Cr_2O_3$ equivalent) in 50 ml $H_2O$ was stirred into the aluminum solutions. Sixty-one grams aqueous colloidal silica (Ludox® LS, 30% $SiO_2$) were acidified with 6 drops HCl (37%) to a pH of ~2 and this silica sol was stirred into the mixture of the chromium and aluminum containing solutions. The resultant dispersion was filtered through a No. 50 Whatman filter paper and concentrated in a Rotavapor® flask until fibers were readily formed by inserting and withdrawing a glass rod. Equivalent oxide solids content was ~39.8%.

The clear, green concentrate was extruded through a die containing six .075 mm diameter holes at a pressure of ~14 kg/cm² and drawn by and wound on a 15 cm diameter drum located ~1 meter below the die at a linear rate of ~48 meters per minute.

The green-state coil was cut, removed from the drum, and separated into three 47 cm long bundles or hanks, which were suspended across a silica rod and fired in air from room temperature to 600°C in one hour. One sample was removed and examined under a stereoscopic microscope at 140X with oblique illumination and was observed to be gold-mustard in color, straight, smooth, shiny, predominately clear, transparent, and about 20μ to 25μ diameter. They were strong and flexible. Another bundle was removed at 800°C (RT to 800°C ≃ 1-½ hours) and the fibers were smooth, shiny, pastel green in color, translucent to opaque, and about 20μ in diameter. Sparkly specks within the fibers indicate they contain crystalline species when observed at 140X. Strength appeared to be about the same as those fired to 600°C.

Another hank was fired to 1000°C (RT to 1000°C≃ 2 hours). Fibers were slightly darker green in color than the 800°C fired fibers, but otherwise, were about the same.

The composition of these fibers was calculated to be equivalent to $6Al_2O_3:1Cr_2O_3:12.7SiO_2$ on a mole ratio or 40.2% $Al_2O_3$, 9.8% $Cr_2O_3$, 50% $SiO_2$ by weight. X-ray diffraction analyses showed that fibers fired to 600°C were amorphous; those fired to 800°C contained $Cr_2O_3 + Al_{2-x}Cr_xO_3$ + amorphous material; and those fired to 1000°C contained $Cr_2O_3 + Al_{2-x}Cr_xO_3 + \gamma\text{-}Al_2O_3$ (indefinite).

Light microscopy studies showed:

| Firing Temp. °C | $N_d$ (index of refraction) | Observations |
|---|---|---|
| 600°C | ~1.52 | Porous sheathed very fine micromottling |
| 800°C | ~1.55 to 1.56 | $N_d$ of core > 1.522 <br> $N_d$ of skin < 1.552 } porous <br> Many fine crystals ~ ½ - 1μ on surface and throughout fiber. Micromottling |
| 1000°C | ~1.580 to 1.586 | Porous $N_d$ of core ≥1.586 <br> $N_d$ of skin <1.586 <br> Microcrystals on surface and throughout fiber. Micromottling more prevalent than in 800°C fiber |

EXAMPLE 6

$3Al_2O_3:1Cr_2O_3:3SiO_2$

Aluminum formoacetate (88.8 gms) was dissolved in 250 ml $H_2O$ heated to 70°C. Colloidal silica was added to the stirred aluminum formoacetate solution in the form of Nalco® 1034A (51.7 gms). Then $CrCl_3.6H_2O$ (53.3 gms) was added to the mixture to form a clear mixture. This mixture was filtered through a No. 54 Whatman filter paper and concentrated in a Rotavapor®. The resulting viscous solution was spun into fibers as described previously to yield clear, continuous, green fibers. The fibers were dried overnight at 42°C and then fired under a variety of conditions. These fired samples were examined by X-ray diffraction and the observations are recorded in the following table. Lattice parameters for $Al_{2-x}Cr_xO_3$ are compared to known values for $Al_2O_3$ and $Cr_2O_3$.

| Firing Schedule | X-Ray Results |
|---|---|
| 1 hr.    1 hr. <br> RT → 650°C → 800°C <br> 800°C for 1 hour | $(Al_{2-x}Cr_xO_3)^{100}+(2.01)^{<1}$ |
| 1 hr.    1 hr. <br> RT → 650°C → 900°C <br> 900°C for 1 hour <br> 1 hr.    1:45 hr. | $(Al_{2-x}Cr_xO_3)^{100}+(2.01)^{<1}$ |
| RT → 650°C → 1000°C <br> 1000°C for 1 hour <br> 4:30 hr.    2:15 hr. | $(Al_{2-x}Cr_xO_3)^{100}+(2.01)^{<1}$ |
| RT → 665°C → 1000°C <br> 1000°C for 1 hour <br> 1 hr.    2:30 hr. | $(Al_{2-x}Cr_xO_3)^{100}+2.01^1$ |
| RT → 650°C → 1100°C <br> 1100°C for 1 hour <br> 1 hr.    2:30 hr. | $(Al_{2-x}Cr_xO_3)^{100}+\alpha\text{-}Al_2O_3{}^3+2.01^1$ |
| RT → 650°C → 1200°C <br> 1200°C for 1 hour <br> 1 hr.    2:30 hr. | $(Al_{2-x}Cr_xO_3)^{100}+\alpha\text{-}Al_2O_3{}^7+$ <br> $(2.01)^{<1}$ |
| RT → 650°C → 1300°C <br> 1300°C for 1 hour | $(Al_{2-x}Cr_xO_3)^{100}+$ Mullite$^{90}+$ <br> $SiO_2$ ($\alpha$-crystobalite)$^{70*}$ |

| | $Al_2O_3$ | $Al_{2-x}Cr_xO_3$ | $Cr_2O_3$ |
|---|---|---|---|
| $a_o$ | 4.758 | 4.877 | 4.954 |
| $c_o$ | 12.991 | 13.35 | 13.58 |

Estimated crystallite size is >500 Å
*indefinite - superscript numbers are relative intensity.

The fired refractory fibers contained an equivalent oxide ratio of $3Al_2O_3:1Cr_2O_3:3SiO_2$ and were calculated to be 47.9% $Al_2O_3$, 23.8% $Cr_2O_3$, and 28.2% $SiO_2$ by weight.

EXAMPLE 7

$2Al_2O_3:1Cr_2O_3:0.7SiO_2$

A solution was prepared of 204 gms of aluminum isopropoxide in 1000 gms distilled $H_2O$ and 150 gms of 88% formic acid. Aluminum formoacetate (148 gms) was added to this solution at 70°C to form a stock aluminum containing source. Chromium (III) acetate

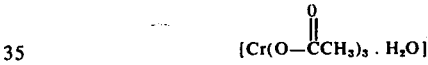
$[Cr(O-\overset{\overset{O}{\|}}{C}CH_3)_3 \cdot H_2O]$ (56.6 gms) was added to 71.8 gms of the above-described aluminum solution. Ludox® LS (3.54 gms colloidal silica - 30% $SiO_2$) which had been acidified with two drops of concentrated HCl was added to this mixture. The resulting mixture was filtered through a 1.5μ Millipore® filter and concentrated in Rotavapor®. The viscous mixture (oxide solids equiv. 27.8%) was spun as described previously to form continuous green filaments of about 20μ diameter. These green-state fibers were fired from room temperature to 400°C in one-half hour and were very fragile and powdered easily. However, if the green fibers were placed in the furnace at 400°C and the temperature raised to 600°C over one-half hour, the resulting fibers were strong, shiny, and polycrystalline when observed at 140X with a stereoscopic microscope.

The resulting fired fibers had a composition equivalent to $2Al_2O_3:1Cr_2O_3:0.7SiO_2$ and are calculated to be 51.8% $Al_2O_3$, 37.7% $Cr_2O_3$, and 10.4% $SiO_2$ by weight.

EXAMPLE 8

$6Al_2O_3:1Cr_2O_3:1.5SiO_2$

Aluminum formoacetate (Niacet® - 52 gms) was dissolved in 150 ml $H_2O$ at 70°C. Chromium (III) trioxide (5.85 gms) was carefully dissolved in 15 ml $H_2O$ and added to the Niacet® - water mixture. Nalco® 1034A (7.7 gms) was acidified with two drops of concentrated HCl, and this was added to the aluminum-chromium mixture. The resulting mixture was filtered through a No. 50 Whatman paper and the clear mixture concentrated to a solids equiv. of 28.6%. This viscous mixture was extruded through a six 0.075 mm hole spinnerette at a pressure of 21 kg/cm² and drawn by and collected on a 15 cm diameter drum about 30 cm below the spinnerette to form green-state fibers. The dried green-state fibers were fired in an air atmosphere from room temperature to 900°C to form 20μ diameter clear, green, polycrystalline continuous fibers. The resulting fired fibers had an equivalent composition of $6Al_2O_3:1Cr_2O_3:1.5SiO_2$ and were calculated to be 71.6% $Al_2O_3$, 17.8% $Cr_2O_3$, and 10.6% $SiO_2$ by weight.

EXAMPLE 9

$14.9Al_2O_3:1Cr_2O_3:14.35SiO_2$

A solution was prepared by dissolving 87.3 gms aluminum isopropoxide (25.5 gms $Al_2O_3$ equiv.) in an acidic solution of 400 ml $H_2O$ and 60 ml formic acid. Seventy-four grams of aluminum formoacetate (Niacet® - 25.5 gms $Al_2O_3$ equiv.) were dissolved into the first solution which was heated to ~ 70°c. To 113.2 gms of this mixture, containing an equivalent of 10.2 gms $Al_2O_3$, 3 gms chromium acetate (34% $Cr_2O_3$ equiv.) was added. To this mixture 16.8 gms silica sol (Nalco 1034A, 34.5% $SiO_2$), which had been further acidified with 2 drops concentrated HCl, was added and dispersed.

The resultant dispersion was filtered through a No. 54 Whatman filter paper and concentrated in a Rotavapor® flask to an oxide equivalent content of 31.9%.

The green-colored concentrate was extruded through a gold-platinum spinnerette having six .075 mm holes at a pressure of 14 kg/cm² and drawn by and collected on a 15 cm diameter drum at a linear rate of 60 m/min.

The dry green-state coil of fibers was removed from the drum, divided into several bundles about 45 cm long, and fired in air to various temperatures. Firing temperatures and observations were recorded as follows:

| Firing Temperature | Results |
|---|---|
| Room temp. to 600°C | X-ray - amorphous. Yellow, clear, and transparent at 140X stereoscopic microscope examination, strong, continuous, smooth, shiny. Porous $N_d$ of skin >1.55; $N_d$ of core <1.55; faint micromottling. |
| Room temp. to 800°C | X-ray <600 Åγ-$Al_2O_3$.* Green in color, 10–15μ diameter, strength and other observations about same as 600°C fired fibers. $N_d$ ~1.55 to 1.56 Core penetrated by oil; skin not penetrated; micromottling. |
| 300°C to 600°C | Feel much stronger than those fired from room temperature to 600°C, otherwise observations were about the same. X-ray - amorphous |

*indefinite

The fired fiber composition was calculated to be 60% $Al_2O_3$, 6% $Cr_2O_3$, 34% $SiO_2$ and was equivalent to $14.9Al_2O_3:1Cr_2O_3:14.35SiO_2$.

EXAMPLE 10

$3Al_2O_3:1Cr_2O_3:3SiO_2$

An aluminum-containing solution was prepared by dissolving 1200 gms aluminum isopropoxide (isopropylate) in a solution of 8000 ml $H_2O$ and 800 ml formic acid. This solution contained the equivalent of 3.28% of $Al_2O_3$ (328 gms). This solution was heated to 65°C and 1125 gms aluminum formoacetate (Niacet®) was dissolved in it.

The combined solutions contained about 654 gms on an $Al_2O_3$ basis.

To the heated aqueous aluminum solution, 955 gms chromium acetate (34% $Cr_2O_3$ equiv.) was added and dissolved. To this aqueous aluminum and chromium solution, after cooling to room temperature, 1280 gms silica sol (Ludox® LS, 30% $SiO_2$ equiv.) was added and dispersed.

The resultant mixture was concentrated in a Rotavapor® flask to a viscosity of 25000 cps (25°C). The viscous concentrate was extruded through a die containing 130(.075 mm)holes at a pressure of 28 kg/cm² and drawn downward continuously through a drier at ~ 57°C by a roll at a linear rate of about 70 m/min. The fibers were guided together and sized with a mixture of FC-75 and 1-½% HC oil prior to passing around the underside of the drawing roll. After passing around the bottom of this drawing roll, the sized multiple-fiber strand was passed over the top of another roll and allowed to fall in a random or unrestrained fashion onto a moving belt for firing as described in Belgian Pat. No. 779,966. The continuous greenstate strands of this example were fired from room temperature to 700°C on the belt as it moved continuously through a furnace. The elapsed time was about 15 minutes and the strands were maintained in a 700°C zone for about two to three minutes. The strands cooled to room temperature at the exit of the furnace and cooled in about one to two minutes. The fired refractory fibers contained an equivalent oxide ratio of $3Al_2O_3:1Cr_2O_3:3SiO_2$ and were calculated to be 47.9% $Al_2O_3$, 23.8% $Cr_2O_3$, and 28.2% $SiO_2$ by weight.

Samples of the prefired strands were further fired at various temperatures and the fibers were analyzed by X-ray diffraction, electron microscopy and optically with a petrographic microscope at 300X. Tensile strength and modulus of elasticity were determined and are tabulated.

Estimated crystallite size <1000 Å for those fibers fired to 1300°C or below and >1000 Å for those fired above 1300°C. This is an average crystallite size estimated from broadening of X-ray diffraction lines.

| Firing Schedule | Results X-Ray Diffraction | Tensile Strength kgm/cm²* | Modulus kgm/cm²* | Density g/cm³ | Spec. surface area m²/gm |
|---|---|---|---|---|---|
| RT 700°C - Sample A | $Al_{2-x}Cr_xO_3$** | $3.867 \times 10^3$ | $0.506 \times 10^6$ | 2.33 | 84 |
| Sample A placed in furnace at 1.5 hr. RT → 1000°C 1000°C for 1 hour | $Al_{2-x}Cr_xO_3$ | $5.217 \times 10^3$ | $0.668 \times 10^6$ | 2.5 | 95 |
| Sample A placed in furnace at 10 min. 1000°C → 1100°C 1100°C for 1 hour | $Al_{2-x}Cr_xO_3$ | $4.626 \times 10^3$ | $0.780 \times 10^6$ | 2.67 | 76 |

| Firing Schedule | Results X-Ray Diffraction | Tensile Strength kgm/cm²* | Modulus kgm/cm²* | Density g/cm³ | Spec. surface area m²/gm |
|---|---|---|---|---|---|
| Sample A placed in furnace at 10 min. 1100°C → 1200°C 1200°C for 1 hour | $Al_{2-x}Cr_xO_3$ | $8.064 \times 10^3$ | $1.146 \times 10^6$ | 2.97 | 6 |
| Sample A placed in furnace at 10 min. 1200°C → 1300°C 1300°C for 1 hour | $(Al_{2-x}Cr_xO_3)^{100}$+ unknown 30 + α-cristobalite²⁰ | $11.952 \times 0^3$ | $1.392 \times 10^6$ | 2.9 | 8 |
| Sample A placed in furnace at 10 min. 1300°C → 1400°C 1400°C for 1 hour | $(Al_{2-x}Cr_xO_3)^{60}$ + Mullite¹⁰⁰ +α-cristobalite²⁰ | $9.787 \times 10^3$ | $1.434 \times 10^6$ | | |
| Sample A placed in furnace at 10 min. 1400°C → 1500°C 1500°C for 1 hour | $(Al_{2-x}Cr_xO_3)^{60}$ + Mullite¹⁰⁰ +α-cristobalite¹⁰ | $7.052 \times 10^3$ | $1.526 \times 10^6$ | | |
| Sample A placed in furnace at 10 min. 1500°C → 1600°C 1600°C for 1 hour | $(Al_{2-x}Cr_xO_3)^{30}$ + Mullite¹⁰⁰ | | | | |

*5 cm gauge length
**wherein x is greater than 0 and less than 2

Transmission electron microscopy studies on ultra-microtomed slivers yield the following information:

Fibers fired at 700°C - Little crystallinity with weak diffraction pattern; capsule shaped particles measuring about 120 Å by 250 Å to about 190 Å by 1000 Å in a porous amorphous matrix.

Fibers fired at 1000°C - Longitudinal and transverse slices were essentially the same; capsule shaped crystals ranging in size from about 130 Å by 400 Å to 300 Å by 900 Å in a porous amorphous matrix.

Fibers fired at 1200°C - Poorly defined platelike, somewhat hexagonal, crystallites surrounded by a porous matrix; platelets ranged up to 350μ in diameter; occasional rod-shaped particles about 60 Å by 380 Å.

Fibers fired at 1300°C - Large number of lathlike crystallites about 60 Å by 360 Å to 360 Å by 1900 Å as well as cubic crystallites from 60 Å to 380 Å; a small number of these hexagonal platelets were also present.

Fibers fired at 1400°C - Three types of crystallites were observed - randomly oriented lath-like microcrystals ranging from about 40 Å by 250 Å to 320 Å by 2200 Å; cubic crystallites ranging from about 160 Å to 300 Å and a few hexagonal platelets with diameters of from about 500 Å to 640 Å. Longitudinal and transverse sections were essentially the same, therefore there was no apparent preferred orientation of the crystallites with respect to fiber axis.

Light microscopy studies at 300X on several fired fiber batches provided the following information:

| Firing Temp. °C | $N_d$ (index of refraction) | Observations |
|---|---|---|
| 700°C | ~1.62 to 1.65 | Porous core indicated by oil penetration through broken ends; thin sheath ½ - 1μ with lower $N_d$ |
| 1100°C | ~1.67 to 1.70 | Thin sheath as in fibers fired at 700°C with $N_d$ less than that of core; individual green crystals on surface of fibers; fibers are porous as indicated by oil soaking in fiber. |
| 1500°C | ~1.72 to 1.73 | Appears to be completely crystalline; fibers sheathed as in 700°C and 1100°C fired fibers. |

EXAMPLE 11

$3Al_2O_3:0.0955Cr_2O_3:3TiO_2$

An aqueous solution of aluminum formoacetate was made by dissolving 148 gms of aluminum formoacetate (Niacet® - U.C.C.) in 300 gms of hot water. After cooling to room temperature, a solution of 80.5 gms $CrCl_3.6H_2O$ in 100 gms distilled $H_2O$ was mixed with the aluminum salt solution. A clear solution with a pH of ~3.2 resulted Seventy-five grams of glacial acetic acid was stirred into this solution.

A titania source was prepared by carefully stirring 142 gms tetraisopropyl titanate into 75 gms of glacial acetic acid which was cooled in a water bath to minimize the exothermic reaction. The resulting mixture had a pH of about 4.2 and was stirred into the aqueous mixture containing dissolved salts of aluminum and chromium. A precipitate, which formed, was dispersed after stirring for 1-½ hours. After filtering, the solution or sol was concentrated in a Rotavapor®, and the resulting concentrate was clear. Fibers were readily formed by the insertion and withdrawing of a glass rod.

The concentrate was centrifuged to eliminate bubbles and the viscosity and equivalent oxide solids content were determined to be 86000 cps and 26.7 weight percent respectively.

Continuous fibers were formed by extruding the concentrate at a pressure of 15 kg/cm² through a spinnerette containing thirty 0.10 mm diameter holes, and drawing by and collecting the fibers on a 61 cm diameter reel at a linear rate of 76 meters per minute. The reel was located about two meters below the spinnerette, and the fibers were exposed to a gentle flow of warm air at 50°C in the space between the spinnerette

4,125,406 and reel to ensure sufficient drying to prevent sticking to adjacent fibers on the reel. The spinnerette holder was water-cooled with 13°C water to prevent overheating from the warm drying air and changing of concentrate properties during spinning.

The dry fibers had a slight greenish tint. They were removed from the reel and separate 1.8 meter long samples were hung in an air atmosphere kiln and fired from room temperature to various temperatures. Samples were removed after reaching a specific temperature and holding at this temperature for 15 minutes. Results are tabulated below. The oxide composition of fired fibers was calculated to be 44.7% $Al_2O_3$, 20.2% $Cr_2O_3$, and 35.1% $TiO_2$ by weight and the equivalent mole ratio was $3Al_2O_3:0.955Cr_2O_3:3TiO_2$. The fired fibers were about 15μ average diameter.

| Temp. | Density gms/cm³ | Appearance - Visual and 140X stereoscopic exam. | Qualitative X-ray Diffraction Analysis |
|---|---|---|---|
| 500°C | 2.76 | clear, brown to green, shiny, transparent, Some fibers oval - some round | Amorphous |
| 600°C | 2.78 | clear, more green than above, transparent, shiny | Amorphous |
| 700°C | 2.74 | clear, transparent green (emerald green color), strong, shiny | Mostly amorphous, some indication of $\gamma$-$Al_2O_3$ |
| 800°C | 2.57 | clear, transparent, lighter green than above, shiny, strong | Amorphous and $\gamma$-$Al_2O_3$ |
| 900°C | 2.55 | clear, duller green, transparent | Amorphous, Rutile[100] $\gamma$-$Al_2O_3$[50];  |
| 1000°C | 4.08 | opaque, grayish green, weak | Rutile[100]; $\alpha(Al>>Cr)_2O_3$* |

*Closer to $\alpha Al_2O_3$ than $Cr_2O_3$

EXAMPLE 12

$3Al_2O_3:1Cr_2O_3:3SnO_2$

Aluminum isopropoxide (9.7 gm) was added to 50 ml $H_2O$ and 6.5 ml formic acid. Niacet® (8.4 gm) was added to the solution. Chromium (III) acetate (7.4 gm) was added to this mixture. The resulting sol-solution mixture was filtered through No. 54 Whatman filter paper and only a trace of residue remained on the filter paper.

A solution of 17.5 gm $SnCl_4.5H_2O$ in 50 ml of $H_2O$ was prepared and mixed into the Al-Cr solution mixture.

The resulting dilute mixture was concentrated to a fiberizable viscous mixture as described in Example 1 until the solids content was 29.3% as determined by calcination to the oxide.

Fibers were spun using a 6 hole (.075 mm) die and a pressure of 21 kg/cm² at a linear rate of 59 meters/minute. The fibers were taken up on a 15 cm drum using an infrared lamp to dry the green fibers.

Fibers fired from room temperature to 600°C in air were 15–20μ in diameter, clear, continuous, and amber in color. The fired fibers were handleable but not too strong when a single strand was tested by hand (e.g., grasp one end between thumb and forefinger of one hand and pull).

Fibers fired from room temperature to 800°C in air were polycrystalline, clear to translucent, green in color, and strong when tested by hand.

Fibers fired from room temperature to 1000°C in air were similar to those fired to 800°C. There was a silvery layer on the surface of these fibers. The resulting fibers had a molar composition of $3Al_2O_3:1Cr_2O_3:3SnO_2$.

EXAMPLE 13

An aluminum-chromium mixture was prepared exactly as described in Example 12. The 29 gm of a zirconium acetate solution (oxide-equiv. 22% $ZrO_2$) was added to the aluminum-chromium mixture. The combined mixture was concentrated as described in Example 12 to give a mixture containing 29.6% solids.

The fiberizable mixture was spun as described in Example 12 and fibers fired from room temperature to 600°C in air were brown, clear, smooth about 15–20μ diameter. The fired fibers were strong when tested by hand.

Fibers fired from room temperature to 800°C in air were green, clear and smooth, but were somewhat weaker than those fired at 600°C.

The molar composition of the fired fibers was $3Al_2O_3:1Cr_2O_3:3ZrO_2$.

EXAMPLE 14

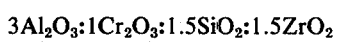

An aluminum-chromium mixture was prepared exactly as described in Example 12. A mixture was prepared of 14 gm zirconium acetate solution (22% $ZrO_2$) and 4.3 gm Nalco® 1034A plus 1 drop concentrated HCl. The mixture of zirconia-silica values was stirred into the aluminum-chromium mixture and concentrated as described in Example 12. The final fiberizable mixture contained 30.4% oxides. Green fibers were spun through a 0.075 mm - 6 hole die under a pressure of 14 kg/cm² at a linear rate of 46 meters/minute.

Some of the resulting green fibers were fired from room temperature to 600°C in air to yield brown clear, shiny fibers with about 15μ diameter. X-ray diffraction analyses indicated the composition was amorphous, but the fibers were strong when tested by hand.

Fibers fired from room temperature to 800°C in air were brown-green in color, clear, polycrystalline and did not feel quite as strong as those fired to 600°C. X-ray diffraction analyses gave a pattern which was tentatively identified as $Cr_2O_3$.

Fibers fired from room temperature to 1000°C in air were green in color, polycrystalline and similar to those fired at 800°C. X-ray diffraction analyses indicated the composition contained cubic or tetragonal $ZrO_2$, $Cr_2O_3$, and $\alpha$-$Al_2O_3$.

The molar composition of the fired fibers was $3Al_2O_3:1Cr_2O_3:1.5SiO_2:1.5ZrO_2$.

EXAMPLE 15

$3Al_2O_3:1Cr_2O_3:1.5ZrO_2:1.5SnO_2$

An aluminum-chromium mixture was prepared exactly as described in Example 12. The 14 gm zirconium acetate solution (22% $ZrO_2$) was added to a solution of 8.75 gm $SnCl_4.5H_2O$ in 40 ml $H_2O$. This latter solution was added to the aluminum-chromium mixture and the total mixture concentrated to 31.2% solids as described in Example 12. Green fibers were drawn as described in Example 14. The green fibers were fired from room temperature to 600°C in air to yield grey, polycrystalline fibers which were not too strong when tested by hand. X-ray diffraction analysis revealed $SnO_2$ and cubic or tetragonal $ZrO_2$.

Green fibers fired from room temperature to 800°C in air yield fibers similar to those fired at 600°C. X-ray diffraction analysis shows $SnO_2$ and tetragonal $ZrO_2$.

Green fibers fired from room temperature to 1000°C in air yield green, polycrystalline fibers which are stronger than those fired to 800°C. X-ray diffraction analysis shows $SnO_2$ and tetragonal $ZrO_2$. Polycrystalline fibers are fibers containing microcrystals, not necessarily 100% crystalline fibers. Some fibers contain amorphous material as well as crystalline material dispersed therein.

EXAMPLE 16

$6Al_2O_3:1Cr_2O_3:1.5SiO_2$

Thirty-six grams of aluminum isopropylate were dissolved in an aqueous formic acid solution of 240 ml $H_2O$ and 24 ml formic acid. This solution was heated to 70°C and 26 gms of aluminum formoacetate was stirred into the mixture. Chromium (III) acetate (13.1 gms) containing 34% $Cr_2O_3$ equivalent was dissolved in 300 ml $H_2O$ and the resultant solution added to the aluminum-containing sulution. Silica sol (7.7 gms Nalco® 1034A containing 34% $SiO_2$ equivalent) acidified with 2 drops concentrated HCl was stirred into the above mixture. The resultant solution-sol mixture was filtered through a No. 54 Whatman filter and concentrated in a Rotavapor® until the concentrate was fiberizable as determined by inserting and withdrawing a glass rod. The solids content determined by calcination was 25% by weight. Fibers were spun by extruding this concentrate through a die containing six holes 0.075 mm in diameter at a pressure of 18 kg/cm² and drawn by and collected on a 15 cm diameter drum about 30 cm below the spinnerette at a linear rate of 39 meters/minute.

Ten centimeter long sections of fibers from the bundle retrieved from the drum were draped over alumina rods and fired in air from room temperature to various temperatures. Fibers fired from room temperature to 600°C (over about one hour's time) were gold in color, clear, 15–20μ diameter, smooth, shiny, and strong. Fibers fired to 800°C (over about two hour's time) were green-gold in color, contained crystals observable at 140X with a stereoscopic microscope, and were smooth, strong, and continuous. Fibers fired to 1000°C (over about three hours' time) were green, contained crystalline particles, were not transparent, were 10–15μ diameter, and not as strong as fibers fired to 800°C. Fibers fired to 1150°C (over about four hours' time) were bluish-green and similar to those fired to 1000°C but not as strong.

Fired fibers of this lot were calculated to contain an equivalent molecular ratio of $6Al_2O_3:1Cr_2O_3:1.5\ SiO_2$ or 71.6% $Al_2O_3$, 17.8% $Cr_2O_3$, and 10.6% $SiO_2$ by weight respectively.

The following table shows that substantially low specific surface areas of the fibers having at least 60% by weight $Al_2O_3$ to 30 m²/g is neither desired nor contemplated in the practice of the present invention. The fiber of Example 7 has no specific surface area measurement, it is not within the scope of the present invention, and had such minimal structural integrity that it crumbled into a powder readily. That example is included to show alternative starting materials.

| EX. | COMPOSITION* | | | SURFACE AREA | | FIRING CONDITIONS |
|---|---|---|---|---|---|---|
| | $Al_2O_3$ | $Cr_2O_3$ | $RO_2$ | Am²/gm | Temp. | |
| 1 | 3 | 1 | 2 $SiO_2$ | 62.5 | 900° | As described in example |
| | | | | 11.3 | 1220° | As described in example |
| 2 | 1 | 1 | 10 $SiO_2$ | 73.7 | 600° | As described in example |
| | | | | 81.6 | 1000° | As described in example |
| | | | | 1.4 | 1200°–1260° | 800° fired sample refired from RT→ 2 hr. 1200°–1260° and held at that temp. 3 hours |
| 3 | 6 | 1 | 30 $SiO_2$ | 128.9 | 800° | As described in example |
| 4 | 2 | 1 | 5.94 $SiO_2$ | 194.4 | 600° | As described in example |
| | | | | 101.5 | 1000° | As described in example |
| | | | | 0.47 | 1200°–1250° | 1000° fired sample refired from RT→ 2 hr. 1200°–1250° and held at that temp. 2 hours |
| 5 | 6 | 1 | 12.7 $SiO_2$ | 122.9 | 600° | As described in example |
| | | | | 77.1 | 1000° | As described in example |
| | | | | 0.28 | 1200°–1250° | 1000° fired sample refired from RT→ 2 hr. 1200°–1250° and held at that temp. 2 hours |
| 6 | 3 | 1 | 3 $SiO_2$ | 44.1 | 1100° | As described in example |
| | | | | 14.4 | 1220° | Sample fired from RT → 1100° refired 12 hr. at 1220° for 1 hour |
| 8 | 6 | 1 | 1.5 $SiO_2$ | 10.3 | 900° | As described in example |
| 9 | 14.9 | 1 | 14.35 $SiO_2$ | 1.9 | 600° | As described in example |
| | | | | 18.3 | 800° | As described in example |
| 11 | 3 | 0.995 | 3 $TiO_2$ | 62.2 | 800° | As described in example |
| | | | | 1.8 | 1200°–1250° | 800° fired sample re- |

| | COMPOSITION* | | | SURFACE AREA | | |
|---|---|---|---|---|---|---|
| EX. | $Al_2O_3$ | $Cr_2O_3$ | $RO_2$ | $Am^2/gm$ | Temp. | FIRING CONDITIONS |
| | | | | | | fired from RT→ 2 hr. 1200°–1250° and held at that temp. 2 hours |
| 12 | 3 | 1 | 3 $SnO_2$ | 36.3 | 1000° | As described in example |
| 17 | 53 | 1 | 35.4 $SiO_2$ | 0.4 | 960° | As described in example |
| | | | | <1 | 1500° | As described in example |

*mole ratio

Surface areas were determined by nitrogen adsorption techniques using a Quantasorb® Model Q S-6 (a product of Quantachrome Corp., Greenvale, N.Y.).

Some further generalizations may be made on the basis of this data. Specifically, higher $Cr_2O_3$ and $RO_2$ content leads to higher specific surface area. The lower the $Cr_2O_3$ concentration, the greater tendency towards transparency, even at higher firing temperatures which tend to render the fibers with higher concentration of chromia translucent or opaque.

EXAMPLE 17

$53Al_2O_3:1Cr_2O_3:35.4SiO_2$

Aluminum formoacetate (726 gm Niacet® - Union Carbide Corp.) was dissolved in 830 gm of water preheated to 60°C and the resulting mixture was cooled to about 23°C. Sixty-eight grams of lactic acid (88%) was added to 289 gm aqueous silica sol (Ludox® LS - 30% $SiO_2$) and this acidified sol was added to the previously prepared aluminum formoacetate solution. An aqueous chromic acetate solution (30.6 gm containing equivalent to 22% $Cr_2O_3$ by weight) was added to the aluminum formoacetate-acidified silica sol mixture. Corn syrup (55 gm, density 1.44 gm/ml, viscosity = 125,000 cps at room temperature) was added to the above mixture.

The resultant sol was filtered through a No. 54 Whatman filter paper and the resulting mixture was concentrated using a Rotavapor® flask arrangement. The flask was partially immersed in a water bath maintained at 40°C during the concentration. The concentration was continued until the mixture had a viscosity of 162,000 cps at 20°C.

The clear concentrate was spun through a 130 hole (0.076 mm diameter holes) spinerette and yarn was fabricated and fired as described in U.S. Pat. No. 3,760,049. The green yarn was fired from room temperature to 960°C in 40 minutes and maintained at 960°C for about 5 minutes. The fired yarn was wound on a cylindrical cone (8.9 cm diameter).

Some of the yarn was subsequently fired by placing a loose sample of yarn in an alumina boat in a furnace at 1500°C in an air atmosphere and maintaining the sample at that temperature for five minutes.

The resultant individual filaments had the following properties.

| | Fired at 960°C | Fired at 1500°C |
|---|---|---|
| Density | 2.80 gm/cm³ | 3.12 gm/cm³ |
| Diameter | ~11 μ | ~10 μ |
| Tensile Strength (2.54 cm gauge length) | 12.66×10³ kg/cm² | |
| Modulus of Elasticity (tensile) | 1.406×10⁶ kg/cm² | |

| | Fired at 960°C | Fired at 1500°C |
|---|---|---|
| X-Ray | η-$Al_2O_3$ | Mullite, slightly larger lattice |
| Crystallite Size (estimated from line broadening) | <800 Å | ≧1000 Å |
| Surface Area | 0.4 M²/gm | <1 M²/gm |

The fibers (both 960° fired and 1500°C fired) were round, smooth, shiny, clear, transparent, and light green in color. The calculated composition was 70.36% $Al_2O_3$, 2% $Cr_2O_3$, and 27.64% $SiO_2$.

I claim:

1. A shaped, fired, transparent, smooth, refractory fiber having at least one microcrystalline phase, the fiber comprising a composition of 10–75% $Al_2O_3$, 1–30% $Cr_2O_3$ and 10–75% $RO_2$ wherein R is selected from silicon, titanium, zirconium or tin wherein the fibers having more than 60% $Al_2O_3$ have a specific surface area of less than 30 m²/g.

2. The fiber of claim 1 wherein said fiber consists essentially of a composition of 10–75% $Al_2O_3$, 1–30% $Cr_2O_3$, and 10–75% $RO_2$, wherein R is as defined above.

3. The fiber of claim 1 wherein the major microcrystalline phase is a solid solution of $Al_{2-x}Cr_xO_3$ wherein x has a value greater than 0 and less than 2.

4. The fiber of claim 1 wherein the major microcrystalline phase is $Cr_2O_3$.

5. The fiber of claim 1 having a microcrystalline phase of $Al_2O_3$.

6. The fiber of claim 1 which is transparent and comprises 55–75% $Al_2O_3$, 1–10% $Cr_2O_3$ and 15–44% $RO_2$.

7. The fiber of claim 1 comprising 10–30% $Cr_2O_3$, 20–65% $Al_2O_3$ and 15–60% $RO_2$.

8. The fiber of claim 1 having two distinct zones identifiable as a sheath and core.

9. The fiber of claim 1 wherein $RO_2$ is silica.

10. The fiber of claim 7 wherein $RO_2$ is silica.

11. A process for forming a smooth, transparent refractory fiber which comprises extruding a viscous concentrate to a fiber form having a metal oxide equivalent composition of:
10 – 75% $Al_2O_3$
1 – 30% $Cr_2O_3$, and
10 – 75% $RO_2$
wherein R is selected from silicon, titanium, zirconium or tin, and, firing said fiber form to develop a transparent fiber having a microcrystalline species therein.

12. The process of claim 11 wherein the fiber form is fired in air.

13. The process of claim 11 wherein the fiber form is dried to a green fiber before firing.

14. The process of claim 11 wherein $RO_2$ is silica.

* * * * *